(12) United States Patent
Frissora et al.

(10) Patent No.: US 8,909,693 B2
(45) Date of Patent: Dec. 9, 2014

(54) TELEPHONY DISCOVERY MASHUP AND PRESENCE

(75) Inventors: Anthony Frissora, Fair Haven, NJ (US); Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 335 days.

(21) Appl. No.: 12/838,242

(22) Filed: Jul. 16, 2010

(65) Prior Publication Data

US 2011/0047246 A1    Feb. 24, 2011

Related U.S. Application Data

(60) Provisional application No. 61/235,838, filed on Aug. 21, 2009.

(51) Int. Cl.
| | |
|---|---|
| *G06F 15/16* | (2006.01) |
| *H04L 29/08* | (2006.01) |
| *G06F 9/54* | (2006.01) |
| *H04M 7/00* | (2006.01) |
| *H04L 29/06* | (2006.01) |

(52) U.S. Cl.
CPC .............. *H04L 67/24* (2013.01); *H04L 67/306* (2013.01); *G06F 9/543* (2013.01); *H04L 67/04* (2013.01); *H04M 7/0057* (2013.01); *H04L 65/403* (2013.01)
USPC ........................................................ 709/203

(58) Field of Classification Search
USPC ......................................... 709/203, 217–218
See application file for complete search history.

(56) References Cited

U.S. PATENT DOCUMENTS

| | | |
|---|---|---|
| RE35,050 E | 10/1995 | Gibbs et al. |
| 5,646,839 A | 7/1997 | Katz |
| 5,727,047 A | 3/1998 | Bentley et al. |
| 5,757,904 A | 5/1998 | Anderson |
| 5,859,974 A | 1/1999 | Mcardle et al. |
| 5,943,406 A | 8/1999 | Leta et al. |
| 5,963,912 A | 10/1999 | Katz |
| 6,044,138 A | 3/2000 | Graham et al. |
| 6,249,570 B1 | 6/2001 | Glowny et al. |
| 6,373,939 B1 | 4/2002 | Reese et al. |
| 6,625,267 B1 | 9/2003 | Graham et al. |
| 6,728,345 B2 | 4/2004 | Glowny et al. |
| 6,792,089 B2 | 9/2004 | Tiliks et al. |
| 6,868,147 B2 | 3/2005 | Wardin et al. |
| 6,885,734 B1 | 4/2005 | Eberle et al. |
| 7,248,678 B2 | 7/2007 | Adams et al. |

(Continued)

FOREIGN PATENT DOCUMENTS

| | | |
|---|---|---|
| CN | 1201200 | 12/1998 |
| CN | 1335557 | 2/2002 |

(Continued)

OTHER PUBLICATIONS

U.S. Appl. No. 12/837,762, filed Jul. 16, 2010, Ricci.

(Continued)

*Primary Examiner* — Jason Recek
(74) *Attorney, Agent, or Firm* — Sheridan Ross P.C.

(57) ABSTRACT

Embodiments of the present invention are directed to a communication system that provides various automated operations, including searches of public and private resources for third party information and presentation of the located third party information by a mashup and preparation of a mashup to combine different communication modes or modes in a common session.

25 Claims, 4 Drawing Sheets

(56) References Cited

U.S. PATENT DOCUMENTS

| | | | |
|---|---|---|---|
| 7,260,198 | B1 | 8/2007 | Scott et al. |
| 8,219,683 | B2 * | 7/2012 | Banerjee et al. ............. 709/226 |
| 2002/0002682 | A1 | 1/2002 | Tsuchiyama et al. |
| 2002/0107904 | A1 | 8/2002 | Talluri et al. |
| 2003/0061039 | A1 | 3/2003 | Levin |
| 2004/0008828 | A1 | 1/2004 | Coles et al. |
| 2004/0243431 | A1 | 12/2004 | Katz |
| 2008/0086763 | A1 | 4/2008 | Amamiya et al. |
| 2008/0109483 | A1 | 5/2008 | Yoo et al. |
| 2008/0120196 | A1 | 5/2008 | Reed et al. |
| 2008/0208605 | A1 * | 8/2008 | Sinha et al. ....................... 705/1 |
| 2008/0298342 | A1 | 12/2008 | Appleton et al. |
| 2008/0301685 | A1 | 12/2008 | Thomas et al. |
| 2009/0036093 | A1 | 2/2009 | Graham et al. |
| 2009/0193148 | A1 | 7/2009 | Jung et al. |
| 2009/0197563 | A1 * | 8/2009 | Yasrebi et al. ............. 455/404.1 |
| 2009/0234655 | A1 * | 9/2009 | Kwon ........................ 704/270.1 |
| 2009/0271474 | A1 * | 10/2009 | Fu et al. ......................... 709/202 |
| 2010/0063867 | A1 * | 3/2010 | Proctor et al. .................. 705/10 |
| 2010/0235524 | A1 | 9/2010 | Klemm et al. |
| 2010/0246570 | A1 | 9/2010 | Chavez et al. |
| 2010/0250583 | A1 | 9/2010 | Klemm et al. |
| 2010/0306119 | A1 * | 12/2010 | Banerjee et al. ............. 705/319 |
| 2011/0072492 | A1 | 3/2011 | Mohler et al. |
| 2011/0078588 | A1 | 3/2011 | Klemm et al. |
| 2011/0161409 | A1 * | 6/2011 | Nair et al. ..................... 709/203 |

FOREIGN PATENT DOCUMENTS

| | | |
|---|---|---|
| CN | 1419780 | 5/2003 |
| CN | 101189603 | 5/2008 |
| CN | 101335634 | 12/2008 |
| GB | 2462030 | 1/2010 |
| JP | 2001-211245 | 8/2001 |
| JP | 2001-257791 | 9/2001 |
| JP | 2002-297646 | 10/2002 |
| JP | 2003-346215 | 12/2003 |
| JP | 2004-129061 | 4/2004 |
| JP | 2004-349784 | 12/2004 |
| JP | 2007-304776 | 11/2007 |
| JP | 2008-060651 | 3/2008 |
| WO | WO 2004/114147 | 12/2004 |
| WO | WO 2005/020106 | 3/2005 |
| WO | WO 2006/096773 | 9/2006 |
| WO | WO 2008/085585 | 7/2008 |
| WO | WO 2008/124368 | 10/2008 |

OTHER PUBLICATIONS

U.S. Appl. No. 12/837,815, filed Jul. 16, 2010, Ricci.
Gellersen et al., "Multi-Sensor Context-Awareness in Mobile Devices and Smart Artefacts," Mobile Networks and Applications, Oct. 2002, vol. 7(5), 17 pages.
International Search Report for International (PCT) Patent Application No. PCT/US2010/044287, mailed Feb. 9, 2011.
Written Opinion for International (PCT) Patent Application No. PCT/US2010/044287, mailed Feb. 9, 2011.
International Preliminary Report on Patentability for International (PCT) Patent Application No. PCT/US2010/044287, mailed Mar. 1, 2012 6 pages.
Official Action with English Translation for Japan Patent Application No. 2012-525599, dated Jun. 10, 2013 8 pages.
Official Action with English Translation for China Patent Application No. 201080029852.3, dated Dec. 4, 2013 10 pages.
Communication-mashups; 3 pages; printed from http://www.communication-mashups.com/wiki/Main_Page (3 pgs), Jul. 2010.
Official Action with English Translation for Japan Patent Application No. 2012-525599, mailed May 8, 2014 4 pages.
Official Action with English Translation for China Patent Application No. 201080029852.3, dated Aug. 5, 2014 13 pages.

* cited by examiner

FIG. 3 ions and routed to an IVR.

TELEPHONY DISCOVERY MASHUP AND PRESENCE

CROSS REFERENCE TO RELATED APPLICATION

The present application claims the benefits of U.S. Provisional Application Ser. No. 61/235,838, filed Aug. 21, 2009, which is incorporated herein by this reference in its entirety.

FIELD

The invention relates generally to communications and particularly to intelligent telecommunication systems.

BACKGROUND

Mashups are fast replacing portals as a means for combining and presenting information to a user. Mashup use is expanding in the business environment. Business mashups are useful for integrating business and data services; business mashup technologies provide the ability to develop new integrated services quickly, to combine internal services with external or personalized information, and to make these services tangible to the business user through user-friendly Web browser interfaces. Business mashups differ from consumer mashups primarily in the level of integration with business computing environments, security, and access control features, governance, and the sophistication of the programming tools (mashup editors) used. Another difference between business mashups and consumer mashups is a growing trend of using business mashups in commercial software as a service offering.

Telecommunications have been slow to adopt mashup technologies and Service Oriented Architectures ("SOA") to integrate and make available disparate data as discrete Web services. A company called "Ifbyphone" and others have introduced the concept of a "phone mashup" by combining voice forms, one to collect information, another to process the information, and another to display the processed information. A voice form includes prerecorded or text-to-speech prompts and questions that are played for a caller and allows caller responses to be recorded or converted into text. When the caller reaches the end of a voice form, the phone mashup platform passes control to a previously created web page. The web page may be hosted on any server, coded in any language, and either secured or unsecured. The web page will receive the collected data via a telephone dialog (e.g., voice form) as a post or retrieve the information in the same manner as an HTML form. The collected data can be written to a database, used to query another web source, or processed conventionally. The processed information is output by the web page as an XML file which informs the platform what to do next.

As a next step, phone mashups permit the initiation of a click-to-call between two parties, a click-to-virtual receptionist, a click-to-voicemail, a click-to a full featured Interactive Voice Response ("IVR") system, a click-to a find me with full recording capabilities, or even a disconnection. Phone mashups support the scheduling of voice broadcast messages, reminder calls, and wake up calls. Telephone connections can be initiated not only from a website but also the communications facilitated by phone mashups may be activated from a telephone call. Calls to a provisioned telephone number can, by the phone mashup, be routed based on the caller ANI (caller ID), routed based on the time-of-day or day-of-week, routed to a voice mail account, routed to a find me feature, routed to a virtual receptionist, and routed to an IVR.

Although phone mashups offer a number of benefits, their use has been relatively limited, both in scope and capabilities.

SUMMARY

These and other needs are addressed by the various embodiments and configurations of the present invention. The present invention is directed generally to an intelligent communication system that monitors user actions and performs various operations responsive to the monitored actions.

In a first embodiment, a system and method are provided that perform the following operations:

(a) determining, by a processor executable virtual assistant module, at least one of an electronic address and identifier of a third party;

(b) determining, by the processor executable virtual assistant module, third party information to be located;

(c) receiving, by the processor executable virtual assistant module, the located third party information;

(d) creating, by a processor executable mashup module, a mashup containing at least part of the third party information; and (e) forwarding the mashup to a communication device of the user for presentation to the user.

The results of the output of the virtual assistant module can be presented to a mashup that logically arranges the contact information associated with a specific user based on the device, display, and user interface and preferences of the device in question (e.g., it adapts the mashup to (or maps predetermined mashup fields to) the device characteristics and/or user preferences). As a result of the mashup, the device user can launch any of a wide variety of communication modes employing a wide variety of media via a single device and a single interface.

The virtual assistant module can query a known contact mode to request permission for the other party to push a broader pallet of choices of contact modes and media. The search for contact information can be performed passively (by seeking the information via internal and external network resources) and/or actively (by actively negotiating with another party on behalf of the user of the device to obtain additional contact information in the form of an eCard, vCard or similar information presented in any form). To illustrate the passive model, assume that party C wants to communicate with party D. Party C could launch a discovery task via the virtual assistant module to fetch and populate information for a mashup. To illustrate the active model, assume that party A is on the phone with party B. With the actuation of a function, the device of party A could request additional contact information about party B via a secondary communication channel. Either model could be done prior to, during or subsequent to a communication session.

This embodiment can permit a communication device to access readily needed resources and information. The resources need not be limited to internal, or enterprise, network resources but can include external network or cloud-accessible resources. The embodiment can provide this user functionality even to communication devices not otherwise on the internal network but rather located on the external network. The embodiment can cache more frequently used information, such as electronic addresses, for quick and ready access by the user.

It can enable to use a single communication device and single user interface to contact a party via a variety of modes in a variety of communication medias or modes. In modern communications, an individual can have a variety of contact links, contexts, personas, and the like. It is not uncommon for a person to have a plurality of voice phone numbers, fax phone numbers, emails, blog/micro-blog/message board/web site personas, or aliases, social media sites, and the like. One usually has to use a browser to link to web locations, a phone or IP phone to link to phones, and a computer or fax machine to link to other fax machines. It can search local contact managers, LDAP or other telephone directory information, human resource databases, web sites, social media sites, blogs/micro-blogs/discussion boards, and the like to discover and provide the information in a mashup to the user. It can overlay the mashup with presence information for the other party in settings where the parties have a trusted relationship. Based on degrees of separation, relationships, and levels of trust, various levels of presence indication (e.g., presence information) can be extended to the other party; that is, a first level of trust would provide a first set of presence information and a second level of trust a different second set of presence information. This can actively show which contact modes might be effective at a point in time.

In a second embodiment, a system and method are provided that perform the following operations:

(a) determining, by a processor executable communication transfer module, that a first party using the first communication device desires to communicate by a first communication mode with a second party using a second communication device, the second communication device being configured to communicate with the first party by a second communication mode, the first and second modes being different;

(b) in response, creating, by a processor executable mashup module, a mashup to communicate with the second party by the first communication mode while the second party communicates with the first party by the second communication mode; and (c) executing, by the processor executable mashup module, the mashup, thereby enabling the first party to communicate, substantially simultaneously and as part of a common communication session, with the second party by the first communication mode and the second party to communicate with the first party by the second communication mode.

The virtual assistant and mashup modules can transcode, change media, or via other adaptation change the discovered information such that it is useful to the user and the specific device that they are using. If one party changes devices or changes contact modes for the other device to be able to transition via a transfer within the mashup to continue communicating to the new device or via the new mode. As will be appreciated, the virtual assistant module and mashup module can be on a communication device or other communication node or shared in a client-server architecture between a communication device/other communication node and a server.

The various embodiments can, by using mashups, provide easy, fast integration, frequently using open APIs and data sources to produce enriching results and new services that were not necessarily the original reason for producing the raw source data. Web-based mashups can enable linking of multiple resources via known APIs. Business mashups can allow integration of complex business and data services without the costly programming normally required. The embodiments can further use Service Oriented Architectures ("SOA") to integrate disparate data by making them available as discrete Web services. Web services provide open, standardized protocols to provide a unified means of accessing information from a diverse set of platforms (e.g., operating systems, programming languages, and applications). These Web services can be reused to provide completely new services and applications within and across organizations, providing business flexibility.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "call log" refers to a collection, or list, of inbound and/or outbound calls. A call is typically described by timestamp (e.g., date and time of day of call set up, termination, or receipt), call duration, called number, calling number, caller identity, and/or caller identity.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "contact" refers to any voice, text, and/or video electronic communication, such as a voice call, E-mail, instant message, text chat, VoIP call, and the like.

The term "customer" or "client" denotes a party patronizing, serviced by, or otherwise doing business with the enterprise The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "EMML", or Enterprise Mashup Markup Language, is an SML markup language for creating enterprise mashups, which are software applications that consume and mash data from variety of sources, often performing logical or mathematical operations as well as presenting data. Mashed data produced by enterprise mashups are presented in graphical user interfaces as mashlets, widgets, or gadgets.

The terms "instant message" and "instant messaging" refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™. Generally included in the instant messaging software is the ability to see the presence of another party; that is, the ability to see whether a chosen friend, co-worker or other selected person (known as a "buddy") is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message.

The term "mashup" refers to a web page or application that uses or combines data or functionality from two or many more external sources to create a new service. To be able to permanently access the data of other services, mashups are generally client applications or hosted online. In the past years, more and more web applications provide Application Programming Interfaces (APIs) that enable software developers to easily integrate data and functions instead of building it themselves. Types of mashups include data mashups (which combine similar types of media and information from multiple sources into a single representation thereby creating a new and distinct web service), consumer mashups (which combines different data types, which are generally visual elements and data from multiple sources), and business mashups (which define applications that combine their own resources, application, and data, with other external web services to focus data into a single presentation and allow for collaborative action among businesses and developers), and enterprise mashups. Two mashup styles are commonly used, namely Web-based and server-based. Whereas web-based mashups typically use the user's Web browser to combine and reformat data, server-based mashups analyze and reformat the data on a remote server and transmit the data to the user's browser in its final form. An example of a mashup is the use of cartographic data to add location information to real estate data, thereby creating a new and distinct Web service that was not originally provided by either source.

The term "mashup editor" refers to a tool or platform for building mashups, which allow designers to visually construct mashups by connecting together mashup components. Exemplary mashup editors include Yahoo! Pipes™, IBM's QEDWiki™, and Microsoft's Popfly™.

The term "mashup enabler" refer to a tool for transforming incompatible IT resources into a form that allows them to be easily combined, in order to create a mashup. Mashup enablers allow powerful techniques and tools (such as mashup platforms) for combining data and services to be applied to new kinds of resources. An example of a mashup enabler is a tool for creating an RSS feed from a spreadsheet (which cannot easily be used to create a mashup). Mashup enablers are often part of mashup editors.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels, which may be real time (e.g., voice communication channel or instant messaging channel) or non-real time (e.g., email, web chat, text chat, and the like). The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "synchronized" means, in the context of databases, maintaining selected fields in the records of one database temporally up to date with respect to changes in the information stored, by the other database, in the selected or equivalent fields.

The term "VoIP" refers to a family of transmission technologies for delivering packetized voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone. Common protocols for VoIP include H.323 and the Session Initiation Protocol.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The disclosure, in various embodiments, provides a system and method to perform a variety of operations discussed in more detail below. One operation is to determine contextual information about an inbound or outbound contact or selected party using a variety of monitoring, analytical, and search mechanisms. Monitoring can be done, for example, by observing a subscriber's or user's activities, collecting information regarding an incoming or outgoing contact, and the like to determine the probable intent of the subscriber or user. Analysis determines the unknown information likely of interest to the subscriber or user. Searching of enterprise or cloud accessible resources locates the unknown information. Another operation is to present the located information to the subscriber by a mashup. The mashup considers a number of factors, such as the capabilities of the subscriber's communication device and the user preferences for the mashup. For example, the mashup can display collected contact links and present them to a user interface to communicate via many modes and in many media with the third party. Another operation is to overlay the mashup with presence information for the other party in settings where the parties have a trusted relationship. This overlay would depict which contact modes might be effective at a selected point in time. Another operation is to transcode or change media or transfers contacts before, during, or subsequent to a communication session. This is typically done by a mashup on one of the communication devices.

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing multimedia information for presentation to a user.

Figure 1:
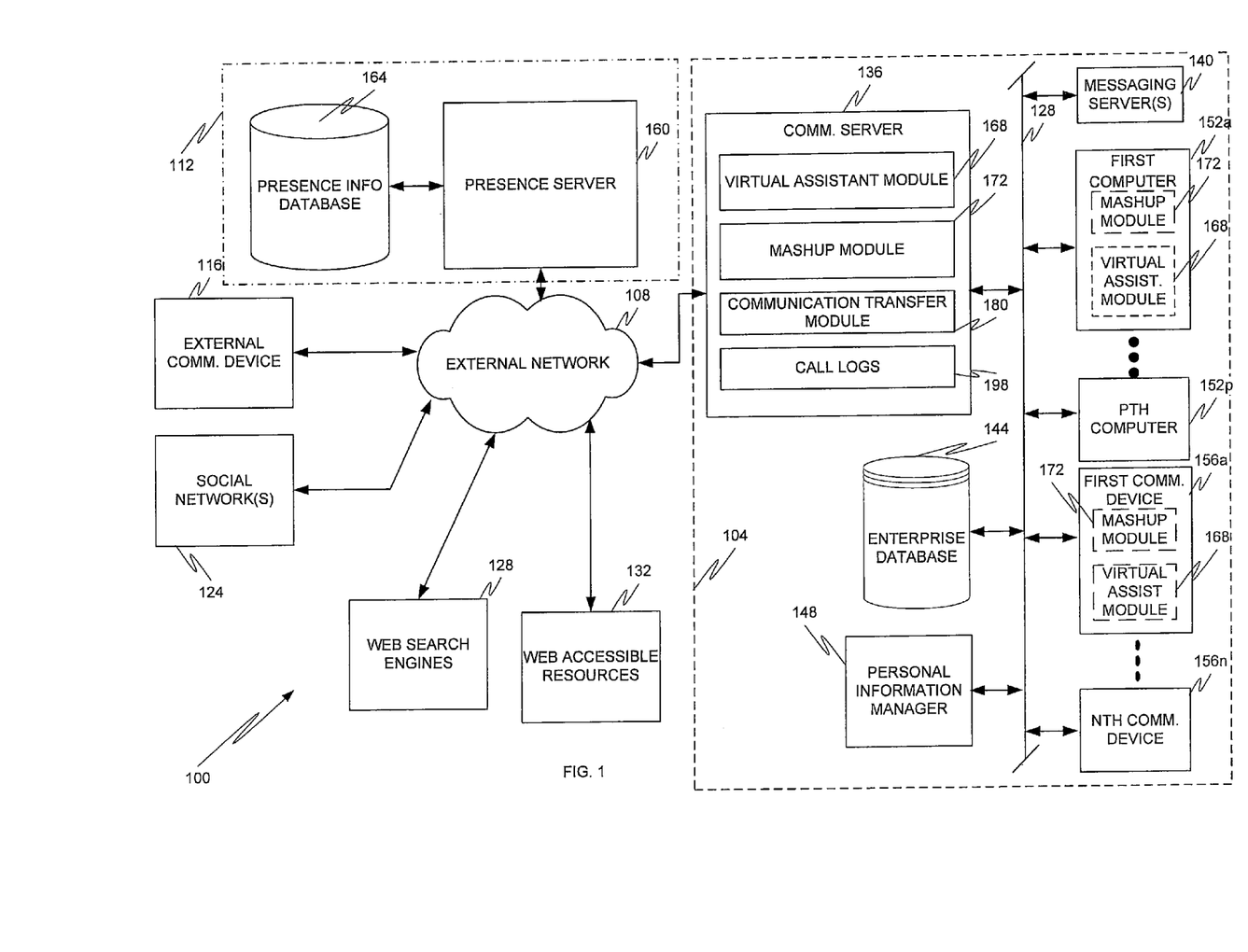
FIG. 1 is a block diagram of a network architecture according to an embodiment.

FIG. 1 depicts an architecture 100 according to an embodiment. Referring to FIG. 1, an enterprise network 104 is in communication, via packet-switched (typically untrusted or unsecure or public) external network 108, with a presence service 112, one or more external communication device(s) 116, a social network 124, web search engine(s) 128, and other web-accessible resources 132.

The external network 108 is preferably a public packet-switched and/or circuit-switched network or set of networks. In one configuration, the external network 108 is a public network supporting the TCP/IP suite of protocols.

The presence service 112 includes a presence server 160 and an associated presence information database 164 that may or may not be operated by (or be external to) the enterprise network. The presence server 160 and presence information database 164 collectively track the presence and/or availability of presence service subscribers and/or their communication devices and provide, to requesting entities, current presence information respecting selected presence service subscribers. As will be appreciated, when the presence service 112 is external to the enterprise the presence service subscribers are different from the enterprise subscribers.

The external communication device(s) 116 can be any suitable circuit- or packet-switched or digital (e.g., TDM-enabled) communication device. Examples include wired and wireless telephones, cellular phones, Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts.

The social network 124 can be any social internetworking service, including those defined above.

The web search engines 128 search for information on the external network 108, including information provided by web accessible resources 132. The information may consist of web pages, images, information and other types of files. Some search engines also mine data available in databases or open directories. Unlike web directories, which are maintained by human editors, search engines operate algorithmically or are a mixture of algorithmic and human input. Web engines typically operate through the sequential operations of web crawling, indexing, and searching. Exemplary search engines include Yahoo!™, Google™, Internet Explorer™, Bing™, Baidu™, AOL™, and Netscape™ search engines.

The web-accessible resources 132 refer to any indexed or otherwise searchable information or services available on the external network 108. Web-accessible resources 132 include information available on web pages, blogs, RSS feeds, and the like.

The enterprise network 104 includes a communications server 136, a (unified) messaging server 140, an enterprise database 144, a personal information manager 148, a plurality of first, second, . . . pth personal computers 152a-p, and a plurality of internal first, second, . . . nth communications devices 156a-n, interconnected by an (trusted or secure or private) internal network 128. The internal network 128 can be secured from intrusion by untrusted parties by a gateway (not shown) and/or firewall (not shown).

The communications server 136 can include a PBX, an enterprise switch, an enterprise server, or other type of telecommunications system switch or server. The communication server 136 is preferably configured to execute telecommunication applications such as the suite of MultiVantage™ or Aura™ applications of Avaya, Inc., including Communication Manager™, Aura Communication Manager™, Avaya IP Office™, and MultiVantage Express™.

The (unified) messaging server 140 may provide features for integrating real-time voice, video and text communication services, such as instant messaging, chat, telephony (including IP telephony), and video conferencing, with non real-time communication services, such as voice mail, e-mail, SMS, and fax.

The personal information manager 148 contains, organizes and/or synchronizes subscriber personal information, such as contact information or address books, electronic calendars, personal notes, lists (e.g., task lists), reminders, text message archives, RSS/Atom feeds, alerts, and project management. An exemplary personal information manager 148 is Outlook™ by Microsoft, Inc. An electronic calendar, as will be appreciated, includes scheduled events indexed by date and time.

The first, second, . . . pth computers 152a-p can be any computational device, with personal computers and laptops being illustrative.

The first, second, . . . nth communication devices 156a-n can be similar to the external communication devices 116. In some embodiments, the communication devices 156a-n may be IP-enabled, SIP-enabled, digital, and/or analog devices. Examples of suitable modified IP telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videphone™), and softphones of Avaya, Inc. Other types of suitable communication devices 156a-n include, without limitation, cellular phones, analog phones, digital phones, etc.

The enterprise database 144 includes enterprise subscriber information, such as name, job title, electronic address information (e.g., telephone number, email address, instant messaging handle, direct dial extension, and the like), subscriber contact lists (e.g., contact name and electronic address information), other employee records, search results, and the like. In one configuration, the enterprise database 144 is configured in accordance with the Lightweight Directory Access Protocol (LDAP).

Included in the memories of the communication server 136 (and/or located in one or more other network nodes on the external and/or internal networks 108 and 128) are a virtual assistant module 168, a mashup module 172, a communication transfer module 180, and call logs 198. As will be appreciated, any or all of these modules can be located alternatively, partially, or in combination, within the internal network 128, in memories of the first, second, . . . pth computers 152a-p and/or of the first, second, . . . nth communication devices 156a-n and, within the external network 108, on one or more nodes.

The virtual assistant module 168 performs contact and context introspection; that is, the virtual assistant module 168 determines contextual information about an inbound or outbound contact or selected party using a variety of monitoring, analytical, and search mechanisms. In one configuration, the information is used to discern or otherwise indicate the context of an inbound communication from the selected third party.

Monitoring can be done, for example, by observing a user's activities, collecting information regarding an incoming or outgoing contact, and the like to determine the probable intent of the user. Monitoring is discussed in more detail below.

Analysis determines the unknown information likely of interest to the user. For example, analysis can simply identify what information is missing from a locally stored ecard or vcard or other template. Alternatively, analysis can identify, dynamically by the nature or content of the incoming contact, what information would be of interest to the user. Analysis is discussed in more detail below.

Searching of enterprise or cloud accessible resources locates the unknown information. Searches of resources on the internal and/or external networks 128 and 108, respectively, are performed to identify information associated with a selected third party or contact for presentation to a user. The searches may be any type of search methodology, including Boolean and/or hierarchical searches, viral searches, and the like. The virtual assistant module 168 can search any file types, including HTML and non-HTML file types.

The third party information to be located by the search can vary. Such information includes electronic addresses (e.g., voice phone numbers, facsimile phone numbers, email addresses, instant message handles, and the like), names, personal or business profiles (e.g., family information, hobbies and other interests, employment information, physical (home or business) addresses, educational background, personal and business affiliations, aliases, personas, and the like), Web content posted by or about the party of interest (such as on blogs, micro-blogs, message boards, web sites, social media sites, and the like), the communication history (e.g., frequency and types of communications) of the user with the third party, and/or other types of third party information.

In one configuration, the third party information determines the context around a current inbound or outbound communication and/or communication history between the user and the third party to determine a probable purpose behind the current communication and/or to determine what information can be presented to the third party. The third party information includes the nature of the association or relationship between the user and third party and the various communication media used by communications between those parties. For example, the user is in sales, and a customer is attempting to contact him. The virtual assistant module 168 determines that the customer has been tweeting the user about a problem with a product sold by the user. This information is presented, by a mashup, to the user when he receives an incoming call from the customer.

In another configuration, the third party information is the number of degrees or levels of separation of the third party from the user. For instance, within an enterprise the number of degrees or levels of separation is determined by the hierarchical structure of the organization. In another example, the number of degrees or levels of separation is determined by the number of mutual acquaintances between two parties who do not directly know one another. One degree of separation means that they have a common friend. Two degrees of separation means that they do not have a common friend but two friends know one another. Other types of trust may also be determined, such as trust established through authentication techniques or trust protocols.

In one configuration, the third party information is all of the identities of the third party. The various identities of a third party, such as facebook identity, twitter identity, presence service identity, email identity, instant message handle, other electronic addresses, and the like, are collected and combined into a single user profile for the third party. Contact history with the third party can overlay the profile to identify for presentation to the user the preferred mode of communication with the third party. This profile can be presented to the user via a common mashup.

In another configuration, the virtual assistant module 168 queries or otherwise obtains from the third party information to be presented to the user. In one application, the parties can negotiate or arbitrate what third party information to be provided. In other words, the third party information provided to the user is not static but dynamic depending on the degree of trust between the parties, the desired degree of transparency of the third party, and the needs of the user. For example, the third party could provide, for trusted entities, a mashup containing alternate communication options over a plurality of contact modes to contact the third party. The mashup could include the most likely, or preferred, communication options. The preferred communication channels can be dynamic based on various factors, such as accessibility, availability, presence state, and the like.

In another configuration, the virtual assistant module 168 queries or otherwise interacts with other parties to obtain the information desired. In one configuration, a viral search is performed that considers indicia of trust with the resources searched. This may be done, for instance, by generating automated e-mail information requests to human entities. The virtual assistant module 168 can be intelligent, like a bot, and interact with the human entity for the information. For example, the virtual assistant module 168 can determine from internal network resources that the user (an enterprise subscriber) has personal or business connections with person X. The virtual assistant module 168 further determines, from a social network profile, that person X knows person Y, the person of interest in the search. The virtual assistant module 168, having determined that a trusted relationship exists, would contact, by a text message such as an instant message or e-mail, person X, requesting the information of interest about person Y and indicating the nature of the trusted relationship through which this information is sought. Different levels of viral search can be used for different levels of trusted relationship. For example, more activities would be taken for a higher level of trust than for a lower level of trust or vice versa. A higher level of trust, for instance, might send an instant message to the trusted third party and provide the user with a pop up indicating the user should also call the trusted third party for the information of interest. A lower level of trust might send simply an email to the trusted third party seeking the information of interest.

By way of illustration, before, during, or after a contact is established or set up between the first communication device 156a of a first user and an external communication device 116 of a third party, the virtual assistant module 168, identifies the third party telephone number of the external communication device 116 and attempts to determine all of the identities of the third party. The virtual assistant module 168 first searches pertinent records on the internal network 128, including the enterprise database 144, records maintained by the personal information manager 148, records maintained by the messaging server(s) 140, local contact list(s) of the first . . . nth communication devices 156a-n and/or first . . . pth computers 152a-p of one or more users, email logs or directories of one or more users, electronic calendars of one or more users, and the like. If the requisite information is still not found, the virtual assistant module 168 interacts with the social network(s) 124 (e.g., LinkedIn, Facebook, etc.), presence service 112, web search engines 128, and, directly or indirectly, with the web accessible resources 132 for the requested information. The information, located on the external and internal networks 108/128, is collected by the virtual assistant module 168 and provided, via a mashup, to the first user on the first communication device 156a and/or on the first computer 152a associated with the first user. Alternatively or additionally, the virtual assistant module 168 caches the collected information and/or causes the collected information to update data repositories, such as locally stored contact lists, and the like.

The virtual assistant module 168 can apply various filter rules and policies to restrict information presented to the user. For example, information located in enterprise resources may pose privacy issues for other users. In a further example, irrelevant located information would be dropped. In another example, user preferences would indicate what located information is and/or is not to be presented to the user. In another example, only the information that can be used by the user is presented to him. Information relating to modes of communication that the user does not have access to on the selected communication device is omitted. The amount of information presented to the user could depend on the degree or level of separation between the user and the third party. A smaller (or closer) degree of separation could cause more information to be presented while or a larger (or more distant) degree of separation could cause less information to be presented or vice versa.

The virtual assistant module 168 can perform call eavesdropping and record or otherwise analyze (e.g., by keyword identification), in substantial real time, a voice conversation between users or between a subscriber and a nonsubscriber. This is achieved by bridging, or connecting, the virtual assistant module 168 onto a contact. The virtual assistant module 168 can be joined for all or only part of the contact. The virtual assistant module 168 receives and records, via the bridge, all or part of one or more audio, text, and/or video streams associated with the contact. An automatic speech-to-text conversion may be performed by the virtual assistant module 168 to form a searchable text transcript. The virtual assistant module 168 can "listen" to the first part of the conversation, for example, when it is typical for a caller to state the purpose of the call.

The mashup module 172 receives the located information (or metadata) and configures it as a mashup for presentation to the user. The mashup may be effected by any suitable technique, such as by mashup editor or enabler. The particular mashup configuration and contents presented to the user depend on the capabilities or provisioning of or user preferences for the particular communication device receiving the mashup. Device capabilities include, for example, screen size, CPUs, random access memory capacity, volatile memory capacity, nonvolatile memory capacity, total memory capacity, compatible and/or hosted communication applications, compatible and/or hosted communication clients, operating system, port configurations, wireless communication capabilities, compatible wired and wireless communication and data protocols, codecs, bandwidth, voice capabilities, video capabilities, text capabilities, and Web capabilities. In one configuration, the mashup module 172 first determines how to display the collected information and how to launch communications from the mashup display. These determinations can be based on observing past and present user behavior, user preferences, predetermined templates, and the like. The mashup is then adapted to the capabilities, provisioning, and/or user preferences of the communication device. In other words, the configuration and content of the mashup display varies depending on the device capabilities, configurations, provisioning and user preferences.

A number of examples will explain the relationship between device capabilities and mashup (display) configuration. For example, if the communication device has no Web browser capability or provisioning or is otherwise not Web browsing capable the mashup configuration would exclude a Web hyperlink. In another example, the communication device is a full featured voice communication device, such as a Personal Digital Assistant, laptop, or personal computer, and the mashup and its display would include a plurality of possible communication modes with the selected third party (e.g., home and/or business voice and/or video telephone, cellular phone, email, instant message, and Short Message Service) with each communication mode having a corresponding probability or other indication of likelihood of reaching the third party by the corresponding communication mode. Communication modes having less than a selected degree of likelihood of succeeding could be filtered out and not presented to the user. For instance, if the third party's cellular phone is currently busy, that communication option would not be presented to the user.

In one configuration, the mashup is effected by a series of EMML forms. A first form includes first collected information and a second form includes second collected information. The collected information and control is passed to a third form, which can be a web page hosted on any server, coded in any language, and either secured or unsecured. The web page receives the collected information as a post or retrieves the information in the same manner as an HTML form. The web page presents the information to the user or subscriber. In response to user input, the web page outputs a command, which can be in the form of an XML file, which informs the virtual assistant 168 what to do next. The next step can, for example, initiate a specified communication mode to a specified communication device of the third party, route the incoming call to voice mail, disconnect a previously connected call, and the like.

The communication transfer module 180 transcodes or changes media or transfers contacts before, during or after a communication session. The media changes permit different participants to a common session to use, in the session, different communication modes. A communication mode refers to a manner, way, or technique of communicating.

By way of example, the communication transfer module 180 could enable handoffs or transfers of calls from a cellular phone to a desk phone and vice versa. In one application, the switching is done automatically, without user input, by locating the cellular phone in spatial proximity to the desk phone or vice versa. Based on the relative locations, the user could be queried whether or not he wants the call transferred to the other communication node. In another application, the switching is done automatically based on needed device capabilities. For instance, the user is on a cellular phone having limited processing and video capabilities. A current call between the user's cellular phone and other parties is a conference call on a video/audio bridge. The communication transfer module 180 determines that the user is in spatial proximity to a desk phone having these capabilities and requests permission from the user to transfer the call to the desk phone. When permission is granted, the communication transfer module 180 instructs the server to process the video call through to the desk phone.

Other examples of different communication modes are presented below.

In one configuration, the transcoding, transformation, or transfer is effected using a mashup generated by the mashup module 172. In a common session, a first communication device appears to communicate by one mode and the other communication device to the session appears to communicate by a different mode. By way of example, the user on a first communication device receives an incoming voice call from a second communication device and wishes to communicate by instant messaging. The voice call can be set up or termed on the first communication device. A mashup is implemented on the first communication device by which the user can, by texting, generate outgoing instant message-type communications and receive incoming voice communications as instant messages. The mashup converts, or transcodes (e.g., by text-to-speech or speech-to-text conversions as appropriate), the outgoing text messages into a voice stream and the incoming voice stream into a text stream. The two channels carry the same payload, namely voice streams in the example.

Alternatively, the conversion or transformation can be effected using control signaling in the Session Initiation Protocol ("SIP"). The disparate channels can be indicated, such as by a common session identifier or address parings, as being part of a common session. In this alternative, the change may be performed for one or both channels in a duplexed communication session. For example, a first channel in a duplexed communication session between first and second parties could be via a first communication mode (such as a voice only, voice/video, or instant message) (either as packet-switched or circuit-switched payload) and a second channel in the duplexed communication session could be via a different second communication mode (such as another of voice only, voice/video, or instant message) (either as packet-switched or circuit-switched payload). For example, the first channel would be over a digital circuit-switched or packet-switched communication medium and carry the first party's voice communications (but not the second party's voice communications) while the second channel would be over the second channel and carry the second party's (but not the first party's) instant message communications, with the respective party's communications being part of a common session. In one configuration, the first and second channels are identified as being part of the common session and the communications sent and received by common endpoints at each end of the session. For example, the first party's first communication device would send to the second party voice communications of the first party and receive from the second party the instant messages of the second party. Conversely, the second party's second communication device would send to the first party instant messages of the second party and receive from the first party the voice communications of the first party. Each of the first and second communication devices can render the disparate communication streams as a common media stream. For instance, the first communication device would convert, by a text-to-speech converter, the instant messages into speech using a synthesized voice and present the speech to the first party. Conversely, the second communication device would convert, by a speech-to-text converter, the first party's voice stream into text and present the text to the second party as instant messages. Due to the use of acronyms and abbreviations by most instant messages, a conversion of acronyms and abbreviations to full text equivalents or vice versa for conversion into speech or text, depending on the particular conversion involved.

Alternatively, the communication transfer module 180 can transfer the session from a first mode to a second mode while keeping the same communication devices as endpoints. For example, a voice call can be transferred, using control signals from SIP, to an instant messaging protocol or channel. This can be done by reinviting the other communication device to reconfigure the session as an instant messaging session. Although a new session would be created, it would appear to the user and third party as the same session with different communication channels.

Figure 2A:
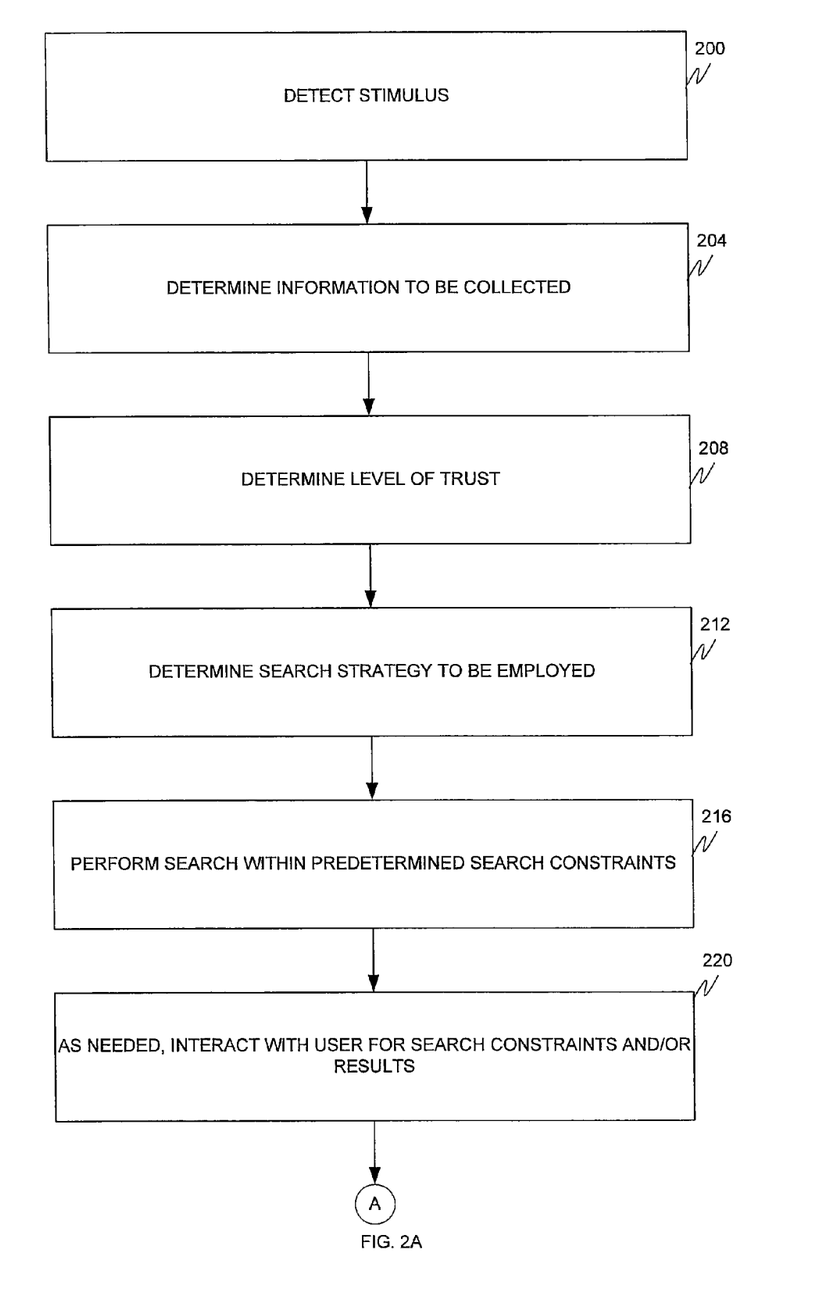
FIGS. 2A-B depict a flow chart according to an embodiment.
Figure 2B:
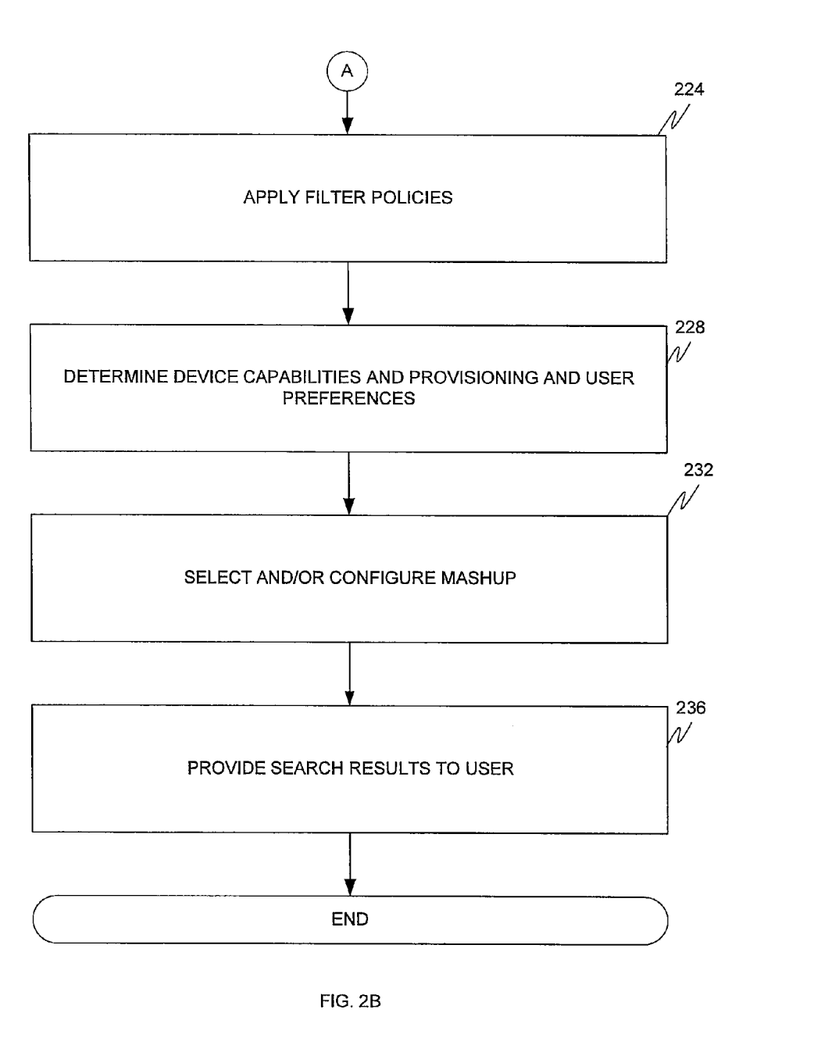

The operations of the virtual assistant module 168 will now be described with reference to FIGS. 1-2. In the ensuing discussion, "communication node" refers to any of the first . . . pth computers 152*a-p* and/or first . . . nth communication devices 156*a-n*.

In step 200, the virtual assistant module 168 in a communication node detects a stimulus. The stimulus may be the press of a key, selection of an icon, receipt of an oral command, input of a destination electronic address, receipt of an incoming contact, and the like. The key press, icon selection, or oral command can request a search, indicate a search type, and provide search term(s), such as an electronic address, third party name, business name, physical address associated with a third party or business, subject identifier or code, and the like. The search type can vary based on a number of parameters, including one or more of a number of hierarchical layers searched, number of viral searched branches pursued, search duration, resources searched, timing of search, number of computer determined synonyms (e.g., in semantic searches), and information desired.

In step 204, the virtual assistant module 168 determines the information to be collected. The desired information to locate in the search is typically predetermined and varies depending on the command received and/or type of or the specific information provided by the user. For example, when the information received is a destination telephone number of a business contact, the desired information is business related. When the information received is a destination telephone number of a non-business acquaintance, no information is desired and no search is performed. The information can be determined based on a predetermined partially populated template, such as an ecard or vcard, comprising multiple information fields. Other variations will be evident to one of ordinary skill in the art.

In step 208, the virtual assistant module 168 determines the level of trust between the user and the third party. This can be based on the nature of the relationship between the parties, the degrees or levels of separation between them, the user preferences set forth in the presence service 112 with respect to the third party, frequency of contact between the parties (e.g., as determined by call logs, email directories, and the like), contact list contents, and the like.

In step 212, the virtual assistant module 168 determines the search strategy to be employed. Search strategy is generally a combination of the search term structure and resources to be searched. The search strategy can be, for example, a function of the user command, search type requested, degree of trust, and the like. Search structure refers to the particular combination of search terms and Boolean modifiers. Resources to be searched include, for example, searching internal network resources only, searching external network resources only, and searching a combination of internal and external network resources. Within these possibilities, the identities of and ordering of the various resources to be searched can be specified. In one illustration, the local data repositories on the corresponding first communication device 156 are searched first, the local data repositories on the corresponding computer 152 second, the other resources on the internal network 128 third, and the resources on the external network 108 fourth.

In step 216, the virtual assistant module 168 performs the search within the determined search constraints. The virtual assistant module 168, as discussed above, may search internal network resources first followed by external resources. The virtual assistant module 168 might truncate or terminate the search or request user permission to continue the search after passage of a certain period of time. Due to the potential use of confidential or sensitive information in the search query, different search strategies (e.g., different search terms) can be used by the virtual assistant module 168 with respect to internal network resources and external network resources. A search term filtration operation can be performed by the virtual assistant module 168, using predetermined policies and rules, to prevent potential publication of confidential or sensitive information on the external network 108. Alternatively or additionally, a virtual private network tunnel or other secured signaling pathway can be set up between the enterprise network and the location service to protect confidential or sensitive information.

In one configuration, the virtual assistant module 168 first searches local data repositories, such as contact lists, electronic calendar entries (to determine if the contact was scheduled and, if so, with whom, via what numbers, and/or with respect to what subject or subject identifier), and other pertinent files and directories, stored by the communication node, for the desired information. If the search term(s) are not located in a stored repository on the communication node (e.g., the dialed number or caller identifier is not found on a locally stored contact list), the virtual assistant module 168 searches other resources on the internal and/or external networks 128 and 108, respectively.

In one configuration where multiple possible sets of search results are located, the corresponding communication device or computer provides the multiple search result alternatives to permit the user to select the appropriate result.

The virtual assistant module 168 can locate pertinent messages stored by the messaging server(s) 140 and document(s) relevant to the incoming or outgoing contact. The messages can be heard or unheard voice messages, read or unread e-mails, read or unread instant messages, and the like. The document(s) may be documents recently edited by the user related to the third party.

The virtual assistant module 168 can maintain a database of search term(s)/result(s) associations to speed future searches.

In step 220, the virtual assistant module 168 in the server and/or communication node, as needed, interacts with the user, for additional search constraints and/or acceptability of results.

In step 224, the virtual assistant module 168 applies filter policies and rules to remove irrelevant, private, or sensitive information from the located information. The virtual assistant module 168 passes control to the mashup module 172.

In step 228, the mashup module 172 determines the communication node capabilities, provisioning and/or user preferences. In one configuration, the communication node is controlled by the communication server 136, and the capabilities, provisioning and/or user preferences are maintained by the communication server 136 and therefore readily accessible by the mashup module 172. In one configuration, the mashup module 172 accesses, via presence service 112, presence information indicating the communication node capabilities, provisioning and/or user preferences. In one configuration, the communication node is external to the communication server 136, and the capabilities, provisioning and/or user preferences are discovered by a series of queries. This configuration only works where the communication node is willing to reveal such information to the mashup module 172. In another configuration, the communication node is external to the communication server 136, and the mashup module 172 provides the desired mashup to the communication node so that the device, which is self-aware of its capabilities, provisioning, and user preferences, can render those parts of the mashup for which it is capable, provisioned, and enabled by user preferences. In one configuration, the mashup module 172 is hosted by the communication node, and performs the steps of FIGS. 2A-B.

In step 232, the mashup module 172 selects and/or configures the mashup to be rendered on the communication node. This rendering is typically a function of the type and volume of located information and the device capabilities and can be configured statically or dynamically. For example, the mashup can be preconfigured, such as by the user. In this configuration, a mashup template is populated by the located information. In another example, the mashup is configured dynamically based not only on device capabilities and the type and volume of located information but also on observed user behavior in prior mashup interactions.

There are an endless number of possible mashup configurations. In one instance, the communication node is a conventional digital telephone having a key pad. The key pad is overloaded or redefined to perform the different functions as defined by the mashup. For example, the key pad could be redefined to provide an instant message button and an instant message client loaded or otherwise made available to provide instant messaging functionality. Even if the instant message client can not be loaded or executed by the operating system of the communication node, the instant message client on a computer associated with the telephone can act as a proxy or intermediate to receive a keyed stream (which could be a DTMF stream) from the telephone, convert it into an equivalent instant message stream, and send the instant message stream on to the third party. When a responsive instant message stream is received from the third party, the computer could convert it into a comprehensible equivalent stream and forward it to the telephone for presentation, by the telephone's display, to the user.

In step 236, the mashup is forwarded to or generated by the communication node for presentation to the user.

Figure 3:
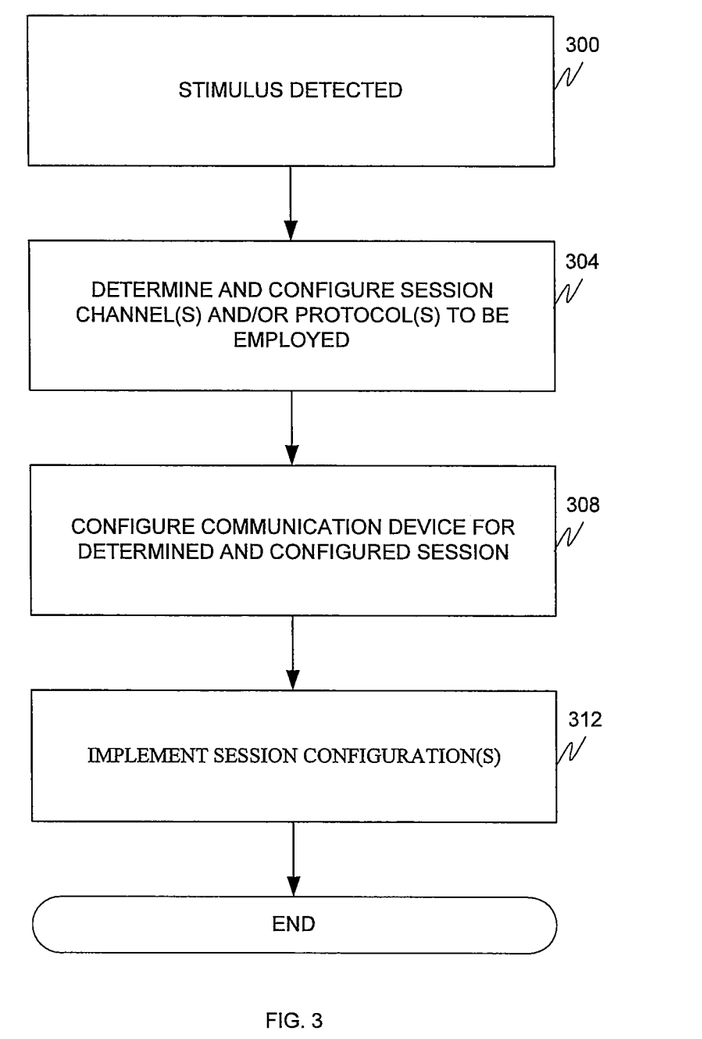
FIG. 3 depicts a flow chart according to an embodiment.

The operation of the communication transfer module 180 will now be discussed with reference to FIG. 3.

In step 300, a stimulus is detected by the communication transfer module 180. The stimulus could be as simple as a request or command by the user or complex as discerning from communication history between the user and the third party using the present communication nodes or from user behavior that he would prefer that a specific configuration of communication modes are to be used.

In step 304, the communication transfer module 180 determines and configures session channel(s) and/or protocol(s) to be employed. The channel(s) and/or protocol(s) can be mixture not only of real time but also non-real time communication modes. Exemplary combinations include voice only or voice/live video call with instant messaging only or instant messaging and live video; voice only call with voice/live video call; instant messaging with e-mail; voice only or voice/live video call with e-mail; and packet-switched voice call with circuit-switched voice call.

In step 308, the communication node is configured for the determined and configured session.

In step 312, the session configuration(s) are implemented. As noted, the session configuration or transformation may occur before or during a session.

The exemplary systems and methods of this invention have been described in relation to a telecommunication system. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a communication server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a processor executable virtual assistant module, at least one of an electronic address and identifier of a third party;
   determining, by the processor executable virtual assistant module, third party information to be located;
   receiving, by the processor executable virtual assistant module, the located third party information;
   creating, by a processor executable mashup module, a mashup containing at least part of the third party information;
   forwarding the mashup to a communication device of a user for presentation to the user, wherein the third party information comprises a personal profile of the third party, a business profile of the third party, a Web posting of the third party, a Web posting about the third party, an alias of the third party, a persona of the third party, and a communication history of the user with the third party, wherein the user is a subscriber to an enterprise network, wherein the user's communication device is controlled by the enterprise network, and wherein a search is performed by accessing first resources in the enterprise network and second resources outside the enterprise network;
   determining presence information for the third party; and
   applying the determined presence information to the mashup, wherein at least one of a plurality of contact modes for the third party included in the mashup is identified as a likely effective contact mode.

2. The method of claim 1, wherein the third party information further comprises a plurality of an electronic address associated with the third party, a name of the third party, and physical address associated with the third party, wherein the user is a subscriber to an enterprise network, wherein the user's communication device is controlled by the enterprise network, wherein the user's communication device is a telephone, wherein the virtual assistant agent is hosted by a server, and wherein the server is part of the enterprise network.

3. The method of claim 1, wherein a level of trust is determined to exist between the user and the third party, wherein the virtual assistant module selects a search strategy based on the level of trust, and wherein differing levels of trust correspond to differing search strategies.

4. The method of claim 1, wherein the user's communication device is involved in a voice communication session with a communication device of the third party, wherein a virtual assistant module receives, while the voice communication session is in progress, at least one of the voice streams exchanged between the communication devices, wherein the virtual assistant module converts the at least one of the voice streams into a text equivalent, wherein the virtual assistant module parses the text equivalent for at least one keyword, and wherein the virtual assistant module, based on a result of the textual parsing, does at least one of (a) determines the third party information to be located; (b) accesses a stored file for presentation to the user; and (c) creates an electronic calendar entry.

5. The method of claim 1, wherein the third party information is used to determine a probable purpose behind an incoming contact from the third party and wherein the third party information is filtered before presentation to the user.

6. The method of claim 1, wherein the virtual assistant module queries a trusted human entity, with whom the user has a trusted relationship, for the third party information.

7. The method of claim 1, wherein the step of determining at least one of an electronic address and an identifier comprises:
    analyzing, by the virtual assistant module, a communication stream of a communication session between the user and third party to determine the at least one of an electronic address and identifier of a third party, the analyzing being performed while the communication session is in progress.

8. The method of claim 1, wherein the created mashup depends upon a capability and/or configuration of a communication of the user and wherein the mashup comprises a plurality of possible communication options to contact the third party and an indication of a likelihood that the third party is presently contactable by the corresponding communication option.

9. A non-transitory computer readable medium comprising processor executable instructions for performing the steps of claim 1.

10. A method, comprising:
    determining, by a processor executable communication transfer module, that a first party using a first communication device desires to communicate by a first communication mode with a second party using a second communication device, the second communication device being configured to communicate with the first party by a second communication mode, the first and second modes being different, wherein the first communication mode is at least one of instant messaging and a voice call and the second communication mode is the other of the at least one of instant messaging and voice call;
    in response, creating, by a processor executable mashup module, a mashup to communicate with the second party using the second communication device by the first communication mode while the second party communicates with the first party using the first communication device by the second communication mode; and
    executing, by the processor executable mashup module, the mashup, thereby enabling the first party to communicate using the first communication device, substantially simultaneously and as part of a common communication session, with the second party using the second communication device by the first communication mode and the second party to communicate with the first party by the second communication mode.

11. The method of claim 10, wherein the first and second communication modes use differing communication protocols.

12. The method of claim 10, wherein the first communication mode is at least one of a circuit-switched and packet-switched voice call and the second communication mode is the other of the at least one of a circuit-switched and packet-switched voice call.

13. The method of claim 10, wherein the mashup comprises a plurality of forms, wherein at least a first form receives a first outgoing stream from the first party and transcodes the first outgoing stream to a modified first outgoing stream compatible with the second communication mode and incompatible with the first communication mode and at least a second form receives a second incoming stream from the second party and transcodes the first outgoing stream to a modified second incoming stream compatable with the first communication mode and incompatible with the second communication mode.

14. A communication system comprising a processor and a non-transitory computer readable medium operable to perform the steps of claim 10.

15. A non-transient computer readable medium comprising processor executable instructions for performing the steps of claim 10.

16. A system, comprising:
    a processor;
    a virtual assistant module executed by the processor, wherein the virtual assistant module is operable to:
        determine at least one of an electronic address and identifier of a third party;
        determine third party information to be located, wherein the third party information comprises a Web posting of the third party and a Web posting about the third party; and
        receive the located third party information; and
    a processor executable mashup module operable to:
        create a mashup containing at least part of the third party information;
        obtain presence information for the third party;
        apply the presence information to identify a first likely effective contact mode of a plurality contact modes of the third party; and
        forward the mashup to a communication device of a user for presentation to the user, wherein the mashup identifies the first likely effective contact mode from the plurality of contact modes of the third party.

17. The system of claim 16, wherein the third party information further comprises at least one of an electronic address associated with the third party, a name of the third party, a personal profile of the third party, a business profile of the third party, an alias of the third party, a persona of the third party, a communication history of the user with the third party, and a physical address associated with the third party, wherein the user is a subscriber to an enterprise network, wherein the user's communication device is controlled by the enterprise network, wherein the user's communication device is a telephone, and wherein the search is performed by accessing first resources in the enterprise network and second resources outside the enterprise network.

18. The system of claim 16, wherein a level of trust is determined to exist between the user and the third party, wherein the virtual assistant module selects a search strategy based on the level of trust, and wherein differing levels of trust correspond to differing search strategies.

19. The system of claim 16, wherein the user's communication device is involved in a voice communication session with a communication device of the third party, wherein a virtual assistant module receives, while the voice communication session is in progress, at least one of the voice streams exchanged between the communication devices, wherein the virtual assistant module converts the at least one of the voice streams into a text equivalent, wherein the virtual assistant module parses the text equivalent for at least one keyword, and wherein the virtual assistant module, based on a result of the textual parsing, at least one of (a) determines the third party information to be located; (b) accesses a stored file for presentation to the user; and (c) creates an electronic calendar entry.

20. The system of claim 16, wherein the third party information is used to determine a probable purpose behind an incoming contact from the third party and wherein the third party information is filtered before presentation to the user.

21. The system of claim 16, wherein the virtual assistant module queries a trusted human entity, with whom the user has a trusted relationship, for the third party information.

22. The system of claim 16, wherein the created mashup depends upon a capability and/or configuration of a communication of the user.

23. The system of claim 16, wherein the mashup comprises a plurality of possible communication options to contact the third party and an indication of a likelihood that the third party is presently contactable by the corresponding communication option.

24. The method of claim 1, wherein the plurality of contact modes for the third party included in the mashup are filtered based on a selected degree of likelihood of effectively contacting the third party.

25. The system of claim 16, wherein the third party information further comprises a personal profile of the third party, a business profile of the third party, an alias of the third party, and a communication history of the user with the third party.

* * * * *